United States Patent
Glas et al.

(10) Patent No.: US 10,404,717 B2
(45) Date of Patent: Sep. 3, 2019

(54) METHOD AND DEVICE FOR THE PROTECTION OF DATA INTEGRITY THROUGH AN EMBEDDED SYSTEM HAVING A MAIN PROCESSOR CORE AND A SECURITY HARDWARE MODULE

(71) Applicant: Robert Bosch GmbH, Stuttgart (DE)

(72) Inventors: Benjamin Glas, Stuttgart (DE); Carsten Gebauer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 354 days.

(21) Appl. No.: 15/333,771

(22) Filed: Oct. 25, 2016

(65) Prior Publication Data

US 2017/0126701 A1 May 4, 2017

(30) Foreign Application Priority Data

Oct. 30, 2015 (DE) .......... 10 2015 221 239

(51) Int. Cl.
| | | |
|---|---|---|
| *H04L 29/06* | (2006.01) | |
| *H04L 9/08* | (2006.01) | |
| *H04L 9/32* | (2006.01) | |
| *H04L 9/34* | (2006.01) | |
| *G06F 12/14* | (2006.01) | |

(52) U.S. Cl.
CPC .......... *H04L 63/123* (2013.01); *H04L 9/0838* (2013.01); *H04L 9/0877* (2013.01); *H04L 9/3236* (2013.01); *H04L 9/34* (2013.01); *H04L 63/1466* (2013.01); *G06F 12/1416* (2013.01)

(58) Field of Classification Search
CPC .... H04L 67/12; H04L 9/0643; G06F 12/1416
USPC .......................................... 726/22
See application file for complete search history.

(56) References Cited

U.S. PATENT DOCUMENTS

| | | | | |
|---|---|---|---|---|
| 6,665,420 B1 * | 12/2003 | Xie | ........................ | G06T 1/0035 380/54 |
| 2004/0117318 A1 * | 6/2004 | Grawrock | ............... | G06F 21/57 705/66 |
| 2008/0065777 A1 * | 3/2008 | Sherkin | ............... | H04L 63/0823 709/229 |
| 2008/0112561 A1 * | 5/2008 | Kim | ........................ | H04L 9/0643 380/42 |
| 2008/0262798 A1 * | 10/2008 | Kim | ........................ | H04L 67/12 702/189 |
| 2013/0086385 A1 * | 4/2013 | Poeluev | ............... | G06F 12/1416 713/176 |

FOREIGN PATENT DOCUMENTS

DE 102009002396 A1 10/2010

* cited by examiner

*Primary Examiner* — Bryan F Wright
(74) *Attorney, Agent, or Firm* — Norton Rose Fulbright US LLP; Gerard Messina

(57) ABSTRACT

A method for protecting data integrity through an embedded system having a main processor core and a security hardware module. The method includes the following: the main processor core generates transmit data, the security hardware module calculates a transmit message authentication code from the transmit data, the main processor core links the transmit data and the transmit message authentication code to form a transmit message, and the main processor core transmits the transmit message to a receiver.

14 Claims, 4 Drawing Sheets

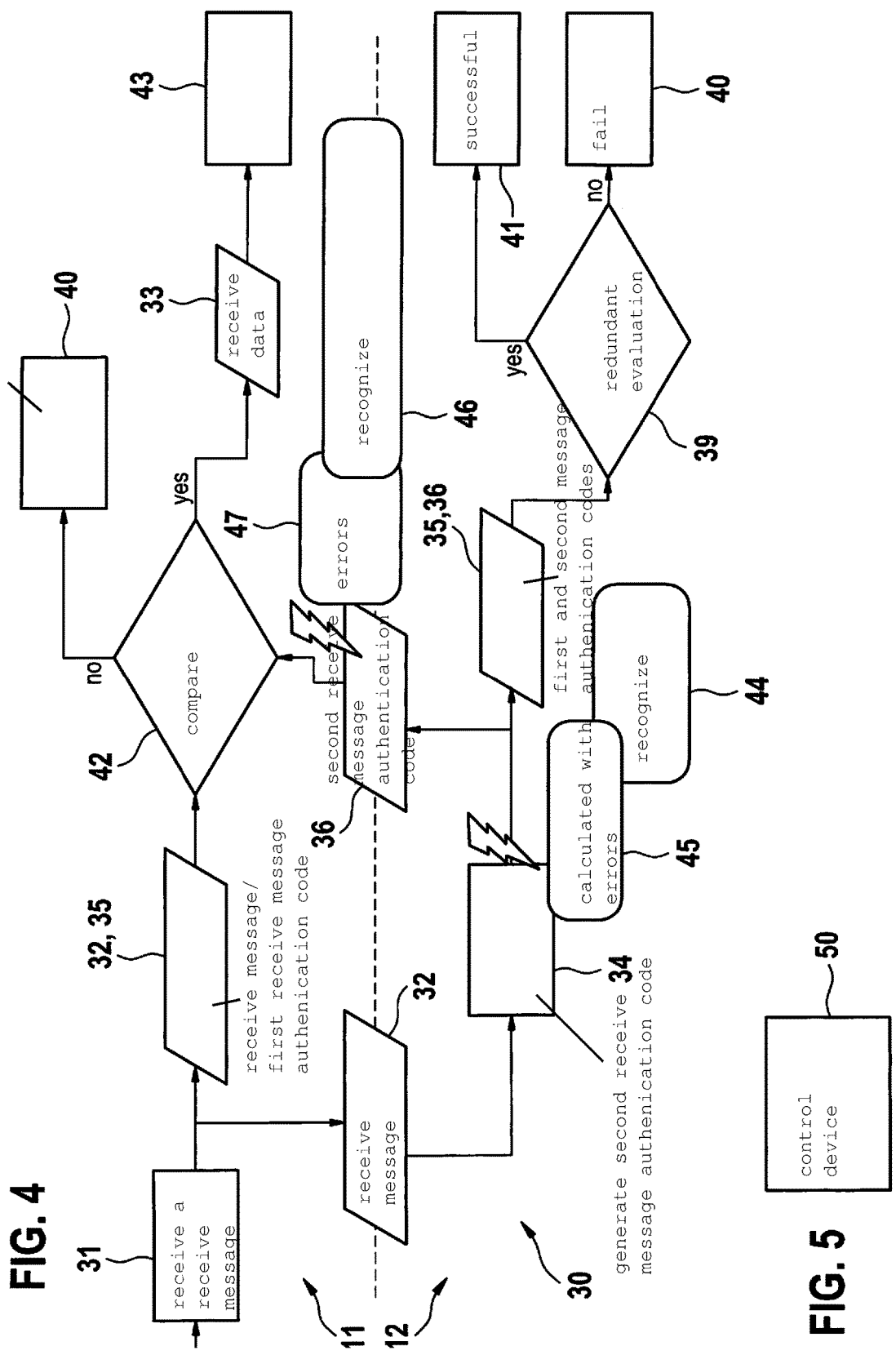

US 10,404,717 B2

METHOD AND DEVICE FOR THE PROTECTION OF DATA INTEGRITY THROUGH AN EMBEDDED SYSTEM HAVING A MAIN PROCESSOR CORE AND A SECURITY HARDWARE MODULE

CROSS REFERENCE

The present application claims the benefit under 35 U.S.C. § 119 of German Patent Application No. DE 102015221239.4 filed on Oct. 30, 2015, which is expressly incorporated herein by reference in its entirety.

FIELD

The present invention relates to a method for protecting data integrity through an embedded system having a main processor core and a security hardware module. The present invention also relates to a corresponding device, a corresponding computer program, and a corresponding storage medium.

BACKGROUND INFORMATION

In the field of IT security, the property of so-called functional safety is regarded as present if a system behaves in conformance with the expected functionality. Information security, in contrast, relates to the protection of the technical processing of information. Information security measures, in this terminological sense, are used to prevent unauthorized data manipulation or the divulging of information.

A message authentication code is used in this context to provide security concerning the origin of data or messages, and to check their integrity. For this purpose, first the sender and receiver agree on a secret key. The sender calculates a message authentication code for this key and for his message, and then sends the message and the message authentication code to the receiver. The receiver calculates the message authentication code for the received message using the key, and compares the calculated message authentication code to the received one. Agreement of the two values is interpreted by the receiver as a successful integrity test: the message was sent by a party who knows the secret key, and the message was not changed during the transmission.

German Patent Application No. DE 10 2009 002 396 A1 describes a method for protection against manipulation of a sensor and of sensor data of the sensor, and a sensor for this purpose, in which, in the context of authentication, a random number is sent from a control device to the sensor, and, for recognition of a manipulation of the sensor data, the sensor data from the sensor to the control device are provided with a cryptographic integrity protection, and, in order to prevent replay attacks, additional time-variant parameters are added to the sensor data, which the sensor data will send from the sensor to the control device with the integrity protection and the added time-variant parameters. Here, after the authentication of the sensor the random number, or a part of the random number, or a number obtained from the random number using a function, are used for the time-variant parameters.

SUMMARY

The present invention provides a method for protecting data integrity through an embedded system having a main processor core and a security hardware module, a corresponding device, a corresponding computer program, and a corresponding storage medium.

Through the use of a message authentication code, an embodiment of the present invention meets the security requirements of functional safety and information security equally, whereas until now information security and functional safety mechanisms have standardly been realized in specific fashion in order to meet the requirements of each—often using different, specially developed hardware.

Under the assumption that the error acquisition properties of a message authentication code can also ensure functional safety to an acceptable degree, according to the present invention the message authentication code can be used in the context of a functional safety mechanism. The implementation, proposed for this purpose, of the MAC generation and testing meets both functional safety and information security requirements.

For the purpose of better protection, here a security hardware module is used. Possible here is in particular a hardware security module (HSM) as specified by Robert Bosch GmbH, or a secure hardware extension (SHE) as specified by the manufacturer initiative software (HIS).

An advantage of the embodiment of the present invention is that the effects of the demands placed on the hardware modules through the use of the message authentication code are reduced. For this purpose, individual processing steps are individually assigned to the main processor core or to the security hardware module.

BRIEF DESCRIPTION OF THE DRAWINGS

FIG. 4 shows the flow diagram of FIG. 3 with identification of new malfunctions relevant to functional safety.

FIG. 5 schematically shows a control device according to a third specific embodiment of the present invention.

DETAILED DESCRIPTION OF EXAMPLE EMBODIMENTS

Specific embodiments of the present invention include two main designs (10, 30) for realizing the MAC processing.

The first design (10) is to route the data path through the main processor core (11) so that the data themselves cannot be damaged by the security hardware module (12). This module can use a copy of the data for the processing, but for the transmission the main processor core (11) should use data that cannot be modified or manipulated by the security hardware module (12). In this way, the functional safety properties of the main processor core (11) are maintained.

Figure 1:
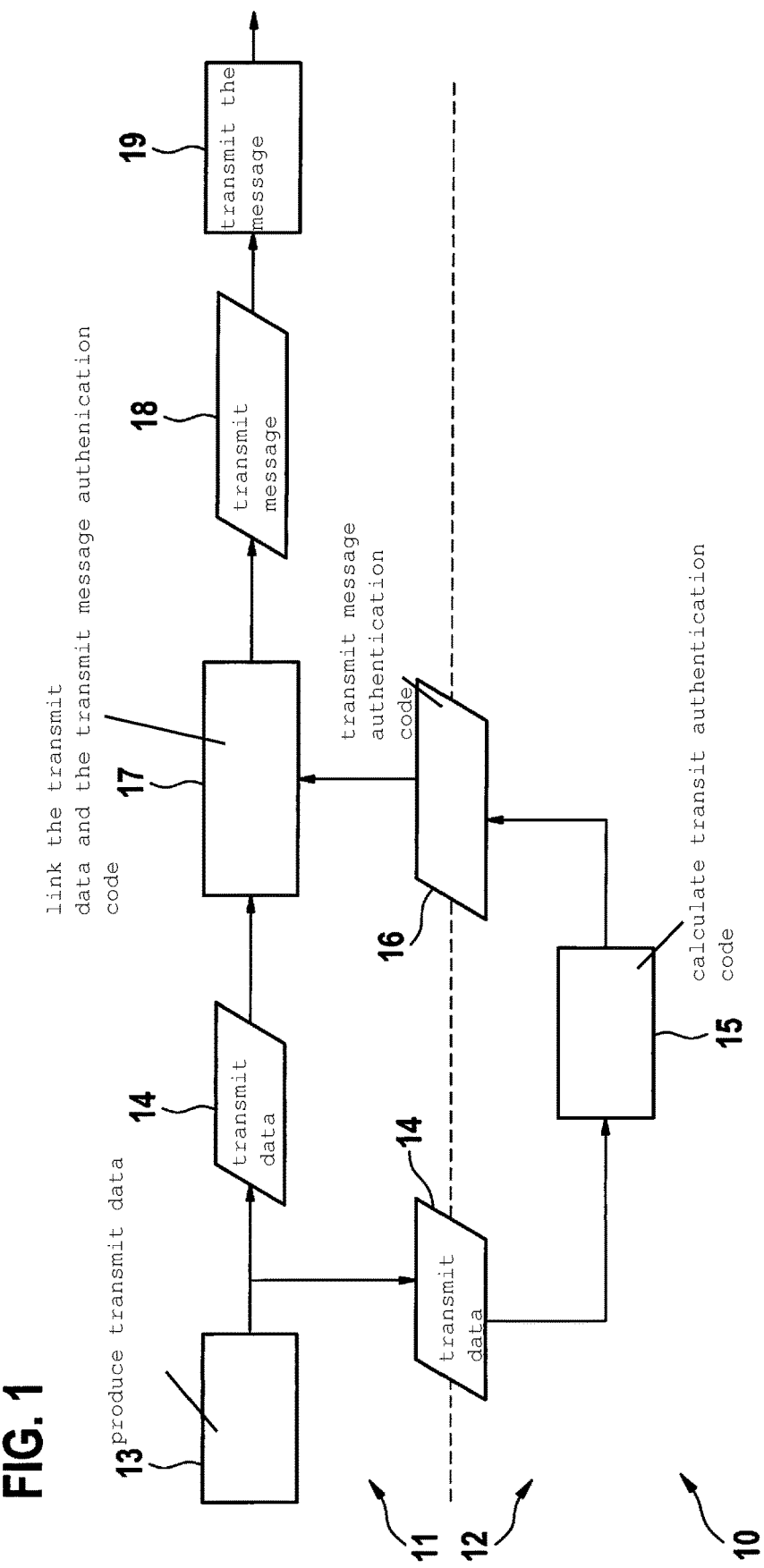
FIG. 1 shows the flow diagram of a transmit method according to a first specific embodiment of the present invention.

FIG. 1 shows this in the case of transmission: the main processor core (11) first produces (13) transmit data (14). The security hardware module (12) calculates (15) from these transmit data (14) a transmit message authentication code (16). The main processor core (11) links (17) the transmit data (14) and the transmit message authentication code (16) to form a transmit message (18), and, finally, transmits (19) this message to the provided receiver.

Figure 2:
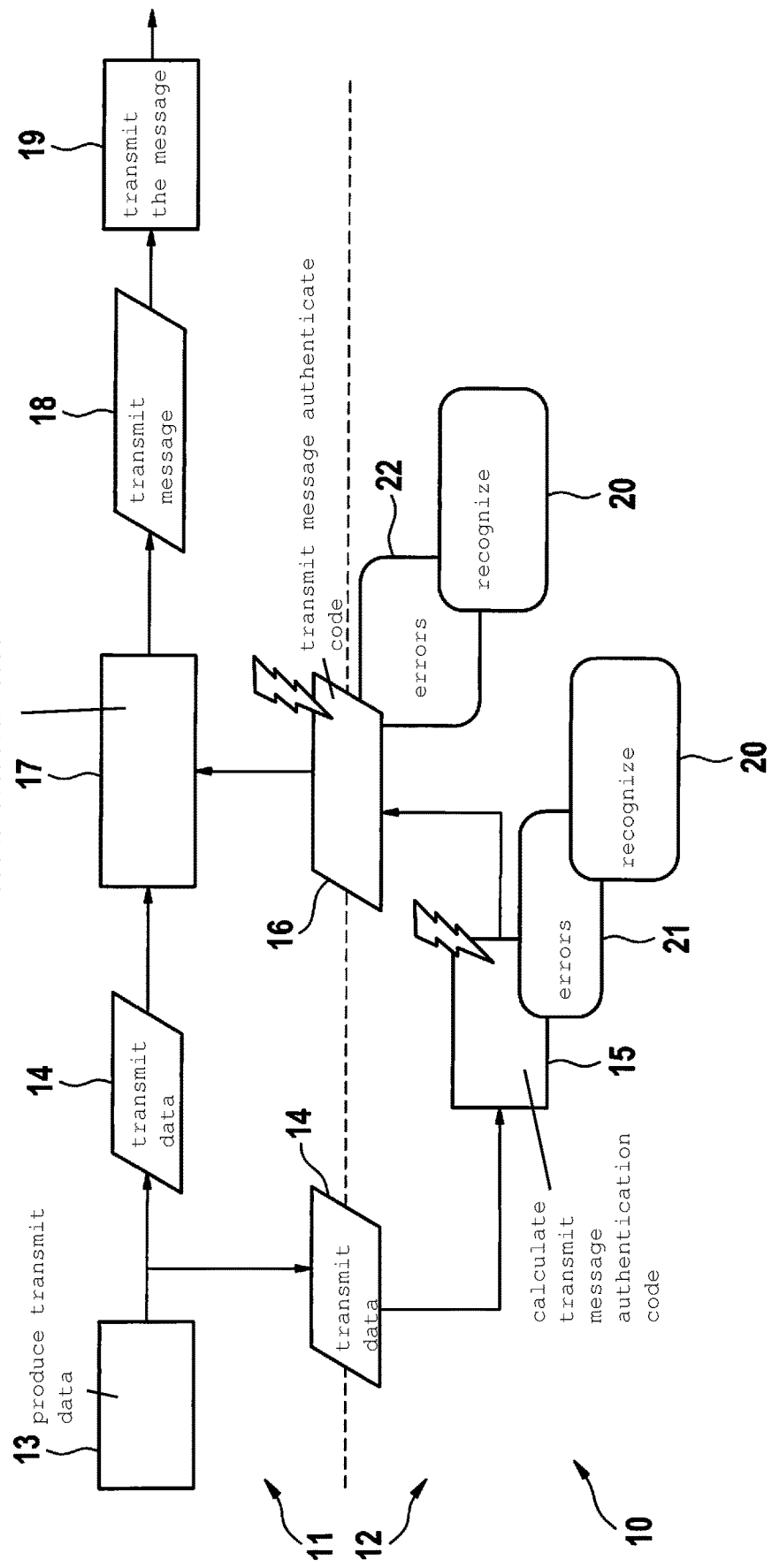
FIG. 2 shows the flow diagram of FIG. 1 with identification of new malfunctions relevant to functional safety.

FIG. 2 also shows the remaining potential malfunctions: if the transmit message authentication code (16) is calculated (15) with errors (21), the receiver nonetheless recognizes (20) this on the basis of the transmit message (18). The same holds correspondingly if the transmit message authentication code (16) is transmitted with errors (22) from the security hardware module (12) to the main processor core (11).

Figure 3:
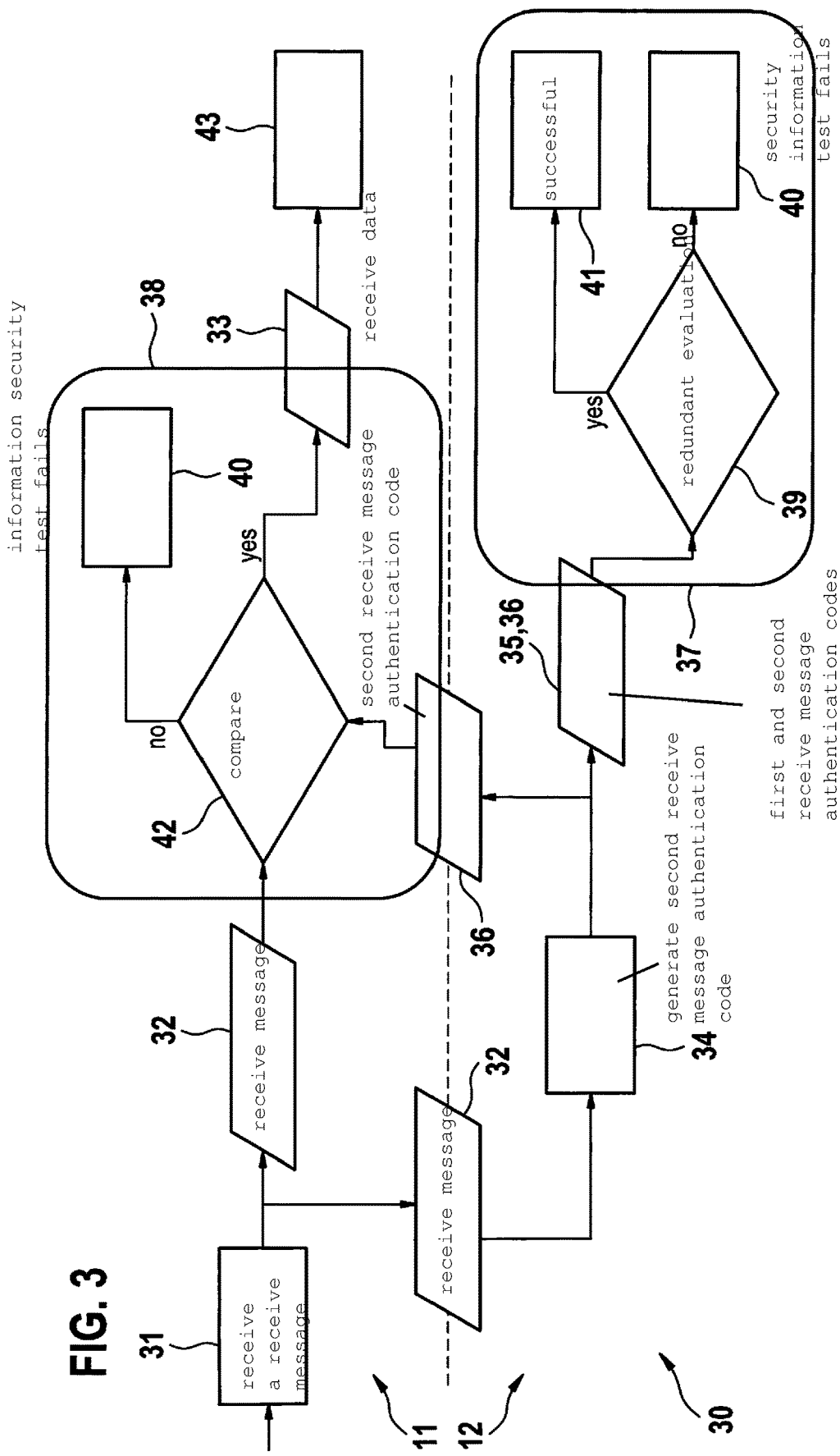
FIG. 3 shows the flow diagram of a receive method according to a second specific embodiment of the present invention.

The second design (30) relates to the case in which the main processor core (11) receives (31) a receive message (32) having receive data (33) and having a first receive message authentication code (35). Here, the check of the first receive message authentication code (35) includes two basic steps that are standardly combined in a function call verifyMAC: first, a second receive message authentication code (36) is generated (34) on the basis of the receive message (32), containing a first receive message authentication code (35), and the preinstalled key. Second, the calculated second receive message authentication code (36) is compared (42) with the received first receive message authentication code (35). Because this comparison is a process relevant to functional safety, this should be executed on the main processor core (11), as is shown in FIG. 3 and in FIG. 4 together with the remaining relevant malfunctions: if the second receive message authentication code (36) is calculated (34) with errors (45), this is easily recognized (44) by the main processor core (11) or by the security hardware module (12). The main processor core (11) likewise recognizes (46) if the second receive message authentication code (36) is transmitted with errors (47) from the security hardware module (12) to the main processor core (11). A redundant evaluation (39) of the receive message authentication codes by the security hardware module (12) ensures information security in this case as well.

It can be pointed out that this separation (30) of the two substeps of MAC verification may stand in conflict with certain design principles of information security. Because the receiver has only to verify, and not to generate, the first receive message authentication code (35), the fundamental security paradigm of least privilege would require limiting of the functional access at the receiver side to the checking of the first receive message authentication code (35), instead of permitting the generation (34) of the second receive message authentication code (36). The latter functionality (34) could be used by an attacker to use a compromised receiver node to impersonate a transmitter. Therefore, it is recommended to choose the variant realization (30) in accordance with system priorities.

This method (10, 30) can for example be implemented in software or hardware, or in a mixed form of software and hardware, for example in a control device (50), as illustrated by the schematic representation of FIG. 5.

What is claimed is:

1. A method for protecting data integrity, comprising:
generating, by a main processor core in an embedded system, transmit data;
calculating, by a security hardware circuit in the embedded system, a transmit message authentication code from a copy of the transmit data, wherein the security hardware circuit is separate from the main processor core in the embedded system;
linking, by the main processor core in the embedded system, the transmit data and the transmit message authentication code to form a transmit message;
transmitting, by the main processor core in the embedded system, the transmit message to a receiver; and
recognizing, by the receiver, based on the transmit message from the main processor core in the embedded system, if the transmit message authentication code is calculated with errors, or, if the transmit message authentication code is transmitted with errors from the security hardware circuit to the main processor core.

2. The method as recited in claim 1, further comprising:
receiving, by the main processor core, a receive message having receive data and a first receive message authentication code;
calculating, by the security hardware module, from the receive message, a second receive message authentication code;
carrying out, by the security hardware module, based on the first receive message authentication code and the second receive message authentication code, an information security test; and
carrying out, by the main processor core, based on the first receive message authentication code and the second receive message authentication code, a functional safety test.

3. The method as recited in claim 2, wherein, in the information security test, the first receive message authentication code is compared with the second receive message authentication code, if the first receive message authentication code differs from the second receive message authentication code, the information security test fails, and if the first receive message authentication code agrees with the second receive message authentication code, the information security test ends successfully.

4. The method as recited in claim 2, wherein, in the functional safety test, the first receive message authentication code is compared with the second receive message authentication code, if the first receive message authentication code differs from the second receive message authentication code, the functional safety test fails, and if the first receive message authentication code agrees with the second receive message authentication code, the main processor core uses the receive data.

5. The method as recited in claim 2, wherein the main processor core or the security hardware module recognize if the second receive message authentication code is calculated with errors.

6. The method as recited in claim 2, wherein the main processor core recognizes if the second receive message authentication code is transmitted with errors from the security hardware module to the main processor core.

7. A non-transitory machine-readable storage medium on which is stored a computer program for protecting data integrity, the computer program, when executed by a processor, causing:
generating, by a main processor core in an embedded system, transmit data;
calculating, by a security hardware circuit in the embedded system, a transmit message authentication code from a copy of the transmit data wherein the security hardware circuit is separate from the main processor core in the embedded system;
linking, by the main processor core in the embedded system, the transmit data and the transmit message authentication code to form a transmit message;
transmitting, by the main processor core in the embedded system, the transmit message to a receiver; and
recognizing, by the receiver, based on the transmit message from the main processor core in the embedded system, if the transmit message authentication code is calculated with errors, or if the transmit message authentication code is transmitted with errors from the security hardware circuit to the main processor core.

8. A device for protecting data integrity, the device comprising an embedded system including a main processor core and a security hardware circuit, wherein the security hardware circuit is separate from the main processor core,
    the main processor core is designed to transmit data, the security hardware circuit is designed to calculate a transmit message authentication code from a copy of the transmit data,
    the main processor core is designed to link the transmit data and the transmit message authentication code to form a transmit message,
    the main processor core is designed to transmit the transmit message to a receiver,
    and the receiver is configured recognize, based on the transmit message, if the transmit message authentication code is calculated with errors, or if the transmit message authentication code is transmitted with errors from the security hardware circuit to the main processor core.

9. The method as recited in claim 1, wherein the security hardware module and the main processor core are part of the same embedded system.

10. The non-transitory machine-readable storage medium as recited in claim 7, wherein the security hardware module and the main processor core are part of the same embedded system.

11. The device as recited in claim 8, wherein the security hardware module and the main processor core are part of the same embedded system.

12. The method as recited in claim 1, wherein the security hardware module is a hardware security module (HSM).

13. The non-transitory machine-readable storage medium as recited in claim 7, wherein the security hardware module is a hardware security module (HSM).

14. The device as recited in claim 8, wherein the security hardware module is a hardware security module (HSM).

\* \* \* \* \*